US012551629B2

(12) United States Patent
Menz et al.

(10) Patent No.: US 12,551,629 B2
(45) Date of Patent: Feb. 17, 2026

(54) PEN-LIKE SYRINGE DEVICE AND SYRINGE SYSTEM

(71) Applicant: Pharmpur GmbH, Königsbrunn (DE)

(72) Inventors: Dirk-Henning Menz, Diedorf (DE); Klaus Ganser, Gilching (DE)

(73) Assignee: Pharmpur GmbH, Königsbrunn (DE)

(*) Notice: Subject to any disclaimer, the term of this patent is extended or adjusted under 35 U.S.C. 154(b) by 756 days.

(21) Appl. No.: 17/913,216

(22) PCT Filed: Nov. 18, 2021

(86) PCT No.: PCT/EP2021/082143
§ 371 (c)(1),
(2) Date: Sep. 21, 2022

(87) PCT Pub. No.: WO2022/112088
PCT Pub. Date: Jun. 2, 2022

(65) Prior Publication Data
US 2023/0158248 A1     May 25, 2023

(30) Foreign Application Priority Data
Nov. 30, 2020   (DE) .................... 20 2020 106 870.9

(51) Int. Cl.
*A61M 5/315*        (2006.01)
*A61F 9/007*        (2006.01)
(Continued)

(52) U.S. Cl.
CPC ....... *A61M 5/3158* (2013.01); *A61F 9/00736* (2013.01); *A61M 5/20* (2013.01);
(Continued)

(58) Field of Classification Search
CPC ........ A61M 5/3158; A61M 5/20; A61M 5/24; A61M 5/30; A61M 2005/31588; A61M 2005/3254; A61F 9/00736
See application file for complete search history.

(56) References Cited

U.S. PATENT DOCUMENTS 4,407,283 A   10/1983  Reynolds
4,790,824 A   12/1988  Morrow
(Continued)

FOREIGN PATENT DOCUMENTS

CN   101695593 A   4/2010
CN   103230633 A   8/2013
(Continued)

OTHER PUBLICATIONS

International Preliminary Report on Patentability dated May 30, 2023 and Written Opinion for PCT/EP2021/082143 filed Nov. 18, 2021.
(Continued)

*Primary Examiner* — Tasnim Mehjabin Ahmed
(74) *Attorney, Agent, or Firm* — Fleit Intellectual Property Law; Paul D. Bianco

(57) ABSTRACT

A syringe device and a syringe system with a syringe device provides an ergonomic syringe device which enables safe operation and safe injection by using a pen-like syringe device having a drive housing, a syringe receptacle for receiving a syringe having a syringe body and a plunger guided therein, and a manually operable push button for activating an electrical delivery unit. The drive housing has a pressure supply unit for pneumatically actuating the plunger and a coupling connection for connection to an external supply unit. The pressure supply unit includes a drive channel which can be connected to the plunger of an inserted syringe. The syringe device has a vent channel connected to the drive channel and via an opening to the
(Continued)

environment, the opening being closable by a finger when the push button is actuated.

20 Claims, 4 Drawing Sheets

(51) Int. Cl.
 *A61M 5/20* (2006.01)
 *A61M 5/24* (2006.01)
 *A61M 5/30* (2006.01)
 *A61M 5/32* (2006.01)
(52) U.S. Cl.
 CPC ............... *A61M 5/24* (2013.01); *A61M 5/30* (2013.01); *A61M 2005/31588* (2013.01); *A61M 2005/3254* (2013.01)

(56) References Cited

U.S. PATENT DOCUMENTS

| | | | | |
|---|---|---|---|---|
| 5,176,645 | A * | 1/1993 | Guerrero | A61M 5/204 604/150 |
| 5,509,904 | A | 4/1996 | Kilham | |
| 5,540,657 | A | 7/1996 | Kurjan | |
| 5,593,388 | A | 1/1997 | Phillips | |
| 9,393,370 | B2 | 7/2016 | Auld | |
| 2004/0035491 | A1 | 2/2004 | Castellano | |
| 2004/0049151 | A1 | 3/2004 | Lell | |
| 2009/0299328 | A1 | 12/2009 | Mudd | |
| 2015/0051574 | A1 | 2/2015 | Tan | |
| 2016/0361496 | A1 | 12/2016 | Guillermo et al. | |
| 2018/0028761 | A1* | 2/2018 | Anand | A61M 5/2033 |
| 2018/0132990 | A1 | 5/2018 | Baeten et al. | |
| 2018/0168789 | A1 | 6/2018 | Shiku | |
| 2018/0304017 | A1 | 10/2018 | Edwards | |
| 2022/0273876 | A1 | 9/2022 | Menz | |

FOREIGN PATENT DOCUMENTS

| | | |
|---|---|---|
| CN | 102497899 A | 9/2014 |
| CN | 105797244 A | 7/2016 |
| CN | 208301963 U | 1/2019 |
| CN | 109310409 A | 2/2019 |
| CN | 106573108 A | 11/2019 |
| DE | 69525567 T2 | 10/2002 |
| EP | 0810890 B | 11/2002 |
| EP | 2090218 B1 | 9/2012 |
| FR | 2714834 A1 | 7/1995 |
| JP | 2013085911 A | 5/2013 |
| NL | 7008369 A | 12/1971 |
| WO | 02/076542 A1 | 10/2002 |
| WO | 2011/022611 A2 | 2/2011 |
| WO | 2021/043614 A1 | 3/2021 |

OTHER PUBLICATIONS

Second Office Action, dated Aug. 22, 2024, for Chinese Patent Application No. 202080011207.2, 20 pages.
Office Action dated Dec. 20, 2024 for European Application No. 20 761 565.9.
For U.S. Appl. No. 17/635,146: Office Action dated May 13, 2025.
International Search Report dated Oct. 16, 2020 for PCT/EP2020/073645 filed Aug. 24, 2020.
Result of Examination Report for German Application No. 10 2019 123 870.6 filed Sep. 5, 2019.
International Preliminary Report on Patentability dated Mar. 8, 2022, with Written Opinion for PCT/EP2020/073645 filed Aug. 24, 2020.
International Search Report dated Feb. 11, 2022, for PCT/EP2021/082143, filed Nov. 18, 2021.
Written Opinion for PCT/EP2021/082143, filed Nov. 18, 2021.
Result of Examination Report for German Patent Application No. No. 20 2020 106 870.9 filed Nov. 30, 2020.

* cited by examiner

PEN-LIKE SYRINGE DEVICE AND SYRINGE SYSTEM

FIELD OF THE INVENTION

The invention relates to a pen-like syringe device and to a syringe system comprising a pen-like syringe device and an external supply unit.

BACKGROUND

In medicine, particularly in the field of ophthalmology, syringe devices or syringe systems with a syringe device and an external supply unit connected to it are used for injecting or removing substances in numerous and different areas of application. In addition to general requirements that must be met, such as ensuring the reliability and safety of an injection or removal, user-friendliness, especially safe and advantageous holding, guiding and actuation of the syringe device, are also important.

SUMMARY

Accordingly, the invention relates to an ergonomic syringe device for medical and in particular for ophthalmological purposes, in particular for the introduction of fluids into the human or animal eye, as well as a syringe system with a syringe device and an external supply unit connected thereto, which enables simple and safe holding, guiding and operating of the syringe device, in particular also independently of the size of the hand of an operator, safe and targeted injection of a substance or removal of a substance, in particular injection into a human or animal eye or removal of a substance from an eye. Further, a contamination of the substance to be injected or removed and/or of the eye is to be prevented.

In this context, the term syringe refers to a device which has a syringe body (or primary container), in particular a cylindrical syringe body, with an ejection device, for example a nozzle and/or a cannula, arranged at its front (proximal) end, and which contains a plunger (without a plunger rod) or a syringe stopper movably guided in the syringe body. In this context, the term syringe also includes so-called carpules and cylindrical ampoules with a pierceable membrane at their front (proximal) end.

A pen-like syringe device and a syringe system are disclosed herein. Appropriate embodiments and advantageous further developments of the invention are also disclosed herein.

A pen-like syringe device is understood to be a substantially elongated syringe device which can be held by an operator in one hand like a pen. The pen-like syringe device is usually held, guided and operated by two fingers (the term finger also including the thumb in the following), in particular between the thumb and index finger, or by three fingers, in particular between the thumb, index finger and middle finger.

The pen-like syringe device according to the invention comprises a drive housing, a syringe receptacle adjoining the drive housing for receiving a syringe, and a manually operable push button for activating an electrical delivery unit, in particular for activating an electrical delivery unit arranged in the drive housing or for activating an electrical delivery unit arranged in an external supply unit connectable to the pen-like syringe device. In this case, the syringe receptacle represents a front (proximal) part and the connection housing represents a rear (distal) part of the pen-like syringe device. A syringe insertable into the syringe receptacle has a syringe body, in particular a cylindrical syringe body, and a plunger or syringe stopper movably guided in the syringe body. At its front (proximal) end, the syringe may have a cone-shaped or cylindrical nozzle or an other ejection device, such as a cannula, wherein a connection, in particular a Luer connection (Luer lock, Luer slip), may be provided on the ejection device for connection to a hose or an injection needle.

The drive housing comprises a pressure supply unit for pneumatically applying pressure or negative pressure to the plunger of a syringe inserted into the syringe receptacle, in particular for directly or immediately applying pressure or negative pressure to the plunger, and a coupling connection for pneumatically and/or electrically connecting the pressure supply unit to an external supply unit which is arranged at a distance from the drive housing. The electric supply unit may comprise a power supply unit and/or an electrical delivery unit, which is supplied with electric power via the power supply unit. The syringe device itself does not have an integrated power supply unit, such as a battery or accumulator, and/or an electrical delivery unit.

For the pneumatic application of pressure or negative pressure to the plunger of a syringe inserted into the syringe receptacle, the pressure supply unit comprises a drive channel which can be connected to the plunger of a syringe inserted into the syringe receptacle. In particular, the drive housing may thereby comprise a connection piece which may extend at least a small distance into the syringe body of an inserted syringe and through which the drive channel or a section of the drive channel extends. Further, the pen-like syringe device comprises a vent channel having a first end connected to the drive channel and a second end connected to the environment via an opening. The opening is closable by a finger actuating the push button when the push button is actuated.

By outsourcing of the power supply unit and/or the electrical delivery unit, the weight of the pen-like syringe device can be significantly reduced compared to a syringe device with an integrated power supply unit and/or electrical delivery unit, making the pen-like syringe device much more comfortable to handle and reducing strain on an operator's hand. In particular, it can be avoided that by arranging the electrical delivery unit and/or the power supply unit in or at the drive housing the weight distribution of the pen-like syringe device is "tail-heavy", i.e. that the rear area of the pen-like syringe device is too heavy compared to the front area, whereby the handling of the pen-like syringe device would be disadvantageous and uncomfortable. This may be particularly the case when using large and powerful electrical delivery units, as well as heavy power supply units and batteries or accumulators. Particularly preferably, the pen-like syringe device has neither a power supply unit, in particular no batteries or accumulators, nor an electrical delivery unit. In this case, the electrical delivery unit and its power supply are integrated in the external supply unit and this is pneumatically connected, for example via a hose, to the coupling connection of the connection housing of the pen-like syringe device. By outsourcing the power supply unit and the electrical delivery unit to the external supply unit, an easy-to-sterilize pen-like syringe device is provided. In particular, no consideration needs to be given to the sensitive electrical delivery unit and power supply unit when the pen-like syringe device needs to be cleaned or sterilized, and therefore damage to the electrical delivery unit and power supply unit can be avoided.

In this context, the pen-like syringe device can also be designed as a low-cost disposable part that is disposed of after a single use or after a few uses. Complex sterilization of the external supply unit is not mandatory, as it can be placed away from the pen-like syringe device and thus away from a patient, for example on an operator's arm, and covered by sterile materials, for example the operator's surgical clothing or an arm or wrist gauntlet. Simple disinfection of the external supply unit after use is sufficient in this case, and sterilization can be dispensed with entirely in this case.

The pen-like syringe device can be used in particular for medical purposes, especially for ophthalmology. For this purpose, the syringe system is expediently made of sterile or sterilizable materials suitable for medical purposes, such as aluminum, stainless steel, sterilization-stable plastics, or combinations thereof. This allows easy sterilization, for example by steam or X-ray or UV irradiation or gamma rays or ethylene oxide.

The pen-like syringe device according to the invention provides an ergonomic syringe device which, in addition to simple and safe holding and guiding, also enables simple and unerring operation of the pen-like syringe device, in particular also independently of the size of the hand of an operator. The pen-like syringe device ensures a safe and targeted injection of a substance or removal of a substance, in particular into or from a human or animal eye. In this regard, the pen-like syringe device can be held like a pen between the thumb and index finger or between the thumb, index finger and middle finger. The holding, guiding and operating of the pen-like syringe device can thereby take place in particular close to the front end of a syringe inserted into the syringe receptacle, for example close to a cannula of the syringe, which faces away from the drive housing, and thus close to the injection or ejection position, for example at an eye to be treated. This provides safe and good guidance of the pen-like syringe device or easy handling of the pen-like syringe device. A possibly required change of a position of the pen-like syringe device during an injection or during a removal, especially a change of the position of the tip of a cannula, for example by retracting or inserting the tip of the cannula into human or animal tissue, is thereby possible in a simple and advantageous manner. A change in position of the pen-like syringe device or an ejection device such as a cannula tip is required, for example, in the field of ophthalmology when dye or a perfluorocarbon or silicone oil bubble is to be placed in the eye.

When the push button is actuated, the electrical delivery unit arranged in the external supply unit or, if applicable, an electrical delivery unit arranged in the pen-like syringe system, in particular arranged in the drive housing, is activated, which provides a pressure or negative pressure for pneumatically applying pressure or negative pressure to the plunger of a syringe inserted in the syringe receptacle. The push button can be actuated, in particular, by the index finger. To inject or remove a substance, only the force required to actuate the push button needs to be applied. Compared to conventional syringes, which require manual actuation of a plunger rod connected to the plunger of the syringe, the pen-like syringe device has a simple and convenient operability. In particular, no great force or strong pushing is required to actuate the pen-like syringe device. This makes it possible to hold and guide the pen-like syringe device safely, in particular also during an injection or removal. It is also conceivable that the force to be applied to actuate the push button is adjustable via a device arranged on the pen-like syringe device, for example to set a desired activation force.

In the pen-like syringe device according to the invention, apart from the application of pressure or negative pressure to the plunger, there is no further media connection with the plunger, for example by a plunger rod or by a hydraulic delivery medium, etc. Therefore, there is no risk of possible contamination of a substance to be injected or removed, which, apart from the interior of the syringe body, is only in communication with the plunger of the syringe.

Furthermore, the embodiment of the pen-like syringe device, in particular the application of pressure or negative pressure to the plunger of a syringe inserted in the syringe receptacle by the electrical delivery unit which can be activated via the push button, enables precise metering of the injection or removal of a substance. In particular, the electrical delivery unit can slowly build up pressure or negative pressure, thus preventing abrupt and uncontrolled injection or removal. Furthermore, an injection in any doses, e.g. dropwise or in continuous flow, and in particular a fine dosing is possible. The dosage can thus be adjusted by the operator directly and according to the actual need, without the need to set or program corresponding parameters in advance. In particular, continuous injection is also ensured without the plunger hooking that occurs with known syringe devices, e.g. due to inhomogeneous siliconization of the syringes and/or due to the plunger sticking to the syringe body. The same also applies to the removal of a substance.

Pressurization or negative pressure is applied to the plunger of a syringe inserted into the syringe receptacle of the pen-like syringe device according to the invention only if the opening arranged at the second end of the vent channel is closed. Otherwise, the drive channel is in communication with the environment via the vent channel. An application of pressure or negative pressure to the plunger and thus a movement of the plunger relative to the syringe body is thereby prevented or immediately terminated. The design of the pen-like syringe device thus ensures immediate or instantaneous termination of an injection or removal as soon as actuation of the push button is terminated or the opening of the vent channel is not or no longer closed. A pressure or negative pressure previously acting on the plunger is immediately relieved via the vent channel. A possible "run-on" or dripping of an injection or a removal of a substance is thus not possible. Further, in case of an unintended or improper actuation of the push button, for example in case of an unintended touch of the push button or for example in case of an improper placement of the finger intended for actuating the push button or an improper handling of the syringe system, the opening of the vent channel is not closed. An unintentional or uncontrolled application of pressure or negative pressure to the plunger or an unintentional or uncontrolled injection or removal is thus prevented.

In a preferred embodiment of the pen-like syringe device, the opening is arranged directly on the push button, for example on the upper side of the push button, or directly next to the push button. The opening can thus be closed directly by a finger actuating the push button, in particular by the actuating finger itself, for example the index finger of an operator. A direct arrangement of the opening next to the push button corresponds to an arrangement of the opening so close to the push button that it can be closed by the finger operating the push button, in particular the third or foremost finger member (end member), when the push button is actuated. The opening of the vent channel is thereby placed in particular in such a way that the operator necessarily closes it when the push button is properly actuated and the syringe system is properly handled. The described design ensures the described immediate and instantaneous termination of an injection or removal and an unintentional or uncontrolled application of pressure or negative pressure to the plunger is prevented.

In a preferred embodiment, the external supply unit contains an electrical delivery unit for supplying the pressure supply unit with pressure or negative pressure. It is expedient that the external supply unit also contains a power supply unit for the electrical delivery unit. The pen-like syringe device itself does not have an electrical delivery unit or a power supply unit. The pressure supply unit is supplied with pressure or negative pressure by the electrical delivery unit arranged in the external supply unit, which can be pneumatically connected, for example via a hose, to the coupling connection of the drive housing, which is pneumatically connected to the drive channel. The arrangement of the electrical delivery unit and the power supply unit in the external supply unit makes the pen-like syringe device particularly light in weight.

Particularly preferably, the electrical delivery unit can be actuated via the push button of the pen-like syringe device, whereby actuation of the push button results in the application of pressure or negative pressure to the drive channel. For this purpose, an electrical connection can be provided between the push button and the electrical delivery unit or the external supply unit. Particularly preferably, the electrical delivery unit comprises a diaphragm pump. The plunger of a syringe inserted into the syringe receptacle is expediently pressurized with compressed air or a negative pressure relative to the atmosphere. Depending on the pressure or negative pressure required, the electrical delivery unit can also comprise several diaphragm pumps, in particular two. The use of a diaphragm pump and the use of air as the driving medium makes it possible to actuate the plunger in a particularly simple and advantageous manner. A mechanical device connected to the plunger for moving it is not required in this case. The use of the diaphragm pump and the application of compressed air or negative pressure to the plunger thus eliminates the need for complex and error-prone gearing between the delivery unit and the plunger. Furthermore, diaphragm pumps are very robust and insensitive to faults.

In an alternative embodiment, the pressure supply unit of the syringe device can comprise an electrical delivery unit, in particular a diaphragm pump, connected to the drive channel, the electrical delivery unit being activated by actuating the push button. In this case, the electrical delivery unit is integrated in the drive housing of the pen-like syringe device and is thus part of the pen-like syringe device. The power supply unit of the electrical delivery unit, on the other hand, is arranged in the external supply unit, the electrical delivery unit being electrically connected to the electrical delivery unit via the coupling connection. Such an embodiment is particularly suitable for pen-like syringe devices and their intended applications, in which small and lightweight electrical delivery units can be used, for example, when the pen-like syringe device is intended to receive small 2.5 ml standard syringes, and the weight saving by outsourcing the power supply unit to an external supply unit is sufficient. The described arrangement of the electrical delivery unit integrated in the pen-like syringe device enables advantageous designs in terms of construction, such as a short electrical connection between the push button and the electrical delivery unit and a short design of the drive channel.

Preferably, the push button is arranged near the front end or the end facing away from the drive housing of the pen-like syringe device. The resulting arrangement of the fingers used to operate the pen-like syringe device near the front end of the syringe, for example near a cannula attached to the syringe, enables the syringe system to be guided safely, in particular when the push button is actuated simultaneously.

In an advantageous embodiment of the pen-like syringe device, the syringe receptacle can comprise or be formed using an operating lever pivotably connected to the drive housing, the operating lever preferably being connected to the drive housing via a swivel joint arranged on a rear region of the drive housing facing away from the syringe receptacle. By pivoting the operating lever connected to the drive housing, it is possible to insert a syringe quickly and easily into the syringe receptacle and to remove the syringe from the syringe receptacle in an advantageous manner. Particularly preferably, the vent channel extends at least partially in the operating lever. Furthermore, the push button and the opening can be arranged on the operating lever. The described embodiment provides a constructionally advantageous embodiment of the pen-like syringe device. For example, additional components forming the vent channel or supporting the push button and the opening are not required.

Preferably, the syringe receptacle comprises a head unit, in particular a head unit arranged on a front region of an operating lever. The head unit at least partially grips the syringe shoulder of a syringe inserted into the syringe receptacle. The syringe shoulder is the front (proximal) area of a syringe, which forms the transition area from the cylindrical syringe body to the nozzle or connection device. In the operating state of the pen-like syringe device, the syringe shoulder or at least a part of the syringe shoulder thereby lies directly against the head unit. Particularly preferably, the syringe inserted into the syringe receptacle is clamped and fixed in the operating state of the pen-like syringe device by the head unit and the side of the drive housing facing in the direction of the syringe receptacle. Preferably, a sealing element, in particular a sealing ring, is arranged here on the side of the drive housing facing in the direction of the syringe receptacle, which sealing element rests against the syringe or a syringe flange of a syringe, thus providing a gas-tight or air-tight connection between the syringe and the drive housing. In this case, the syringe flange represents the rear (distal) end of the syringe, specifically a protruding rim surrounding the cylindrical syringe body. In the embodiment described, clamping of a syringe flange, i.e. fixing of the syringe by clamping the syringe flange on both sides, is in particular not required. Clamping of the syringe flange on both sides often leads to damage or breakage of the syringe flange due to manufacturing tolerances in which the syringe flange is often unintentionally slightly inclined towards the front end of the syringe.

In a preferred embodiment, the pen-like syringe device, in particular the syringe receptacle, can comprise a temperature control unit, especially a heating unit. The temperature control unit is used to control the temperature of a substance to be injected that is contained in an inserted syringe. The temperature control unit can be arranged in particular in the operating lever and/or the head unit. Preferably, the substance to be injected is heated to body temperature. Tempering leads to a reduction in the viscosity of the substance to be injected, which favors injection. The temperature control unit is preferably supplied with electrical energy via a power supply unit arranged outside the pen-like syringe device.

Furthermore, the invention comprises a syringe system with a pen-like syringe device described above and an external supply unit arranged at a distance from the drive housing, which comprises a power supply unit, in particular a battery or an accumulator, and/or an electrical delivery unit, in particular at least one diaphragm pump, and which can be connected or is connected to the pen-like syringe device via the coupling connection. The power supply unit can thereby also supply the above-mentioned temperature control unit with electrical power.

In a preferred embodiment in which the external supply unit comprises both an electrical delivery unit and a power supply unit for supplying electric power to the electrical delivery unit and/or the temperature control unit, the pen-like syringe device has neither an electrical delivery unit nor a power supply unit. In this case, the electrical delivery unit is connected to the coupling connection of the pen-like syringe device, which is in communication with the drive channel, via a hose. The electrical delivery device arranged in the external supply unit is preferably actuated via the push button of the pen-like syringe device, wherein the push button and the electrical delivery device are connected via an actuation connection, which can run in particular through the operating lever, the drive housing, along the coupling connection and together with the hose to the electrical delivery device. In particular, the actuation connection may comprise two sections that can be coupled together, the first section extending in the pen-like syringe device and the second section extending between the pen-like syringe device and the electrical delivery unit.

In an alternative embodiment, in which the external supply unit comprises only the power supply unit, the electrical delivery unit is arranged in the pen-like syringe device, more precisely in the drive housing of the syringe device, and is part of the pressure supply unit. In this case, the power supply unit is connected via a cable to the coupling connection that is in communication with the electrical delivery unit.

Particularly preferably, the external supply unit comprises a fastening device, in particular a wrist band or arm cuff, with which the external supply unit can be fastened to an arm of an operator. This allows the external supply unit to be attached to an operator, in particular the operator's arm, in a particularly simple manner. By arranging the external supply unit on the arm of an operator, the connection between the external supply unit and the pen-like syringe device, for example a hose or a cable, runs in such a way that the handling of the pen-like syringes is not disturbed. In addition, the external supply unit can thereby be easily covered, for example, by an operator's clothing, such as the sleeve of a surgical gown, or an arm or wrist gauntlet. Sterilization of the external supply unit after use is not required, or at least not mandatory. In particular, simple disinfection of the external supply unit can be sufficient.

In a particularly preferred embodiment, the external supply unit has a towel dispenser, in particular a towel dispenser with a preferably textile cover for covering the external supply unit. This makes it particularly easy to cover the supply unit by means of a textile cover arranged on the external supply unit itself.

The external supply unit may further comprise a control unit for controlling the external supply unit, in particular for controlling an electrical delivery unit of the external supply unit. In addition or alternatively, the external supply unit can have a display unit for displaying parameters of the syringe system, in particular the state of the power supply unit and/or the operating parameters of the electrical delivery unit and/or the pressure or negative pressure acting on the plunger of a syringe inserted into the syringe receptacle. This enables optimum control and monitoring of the external supply unit and/or the pen-like syringe device.

BRIEF DESCRIPTION OF THE DRAWINGS

These and other features as well as advantages and effects of the pen-like syringe system according to the invention result from the following embodiments described in more detail with reference to the accompanying drawings. The drawings show.

DETAILED DESCRIPTION

Figure 1:
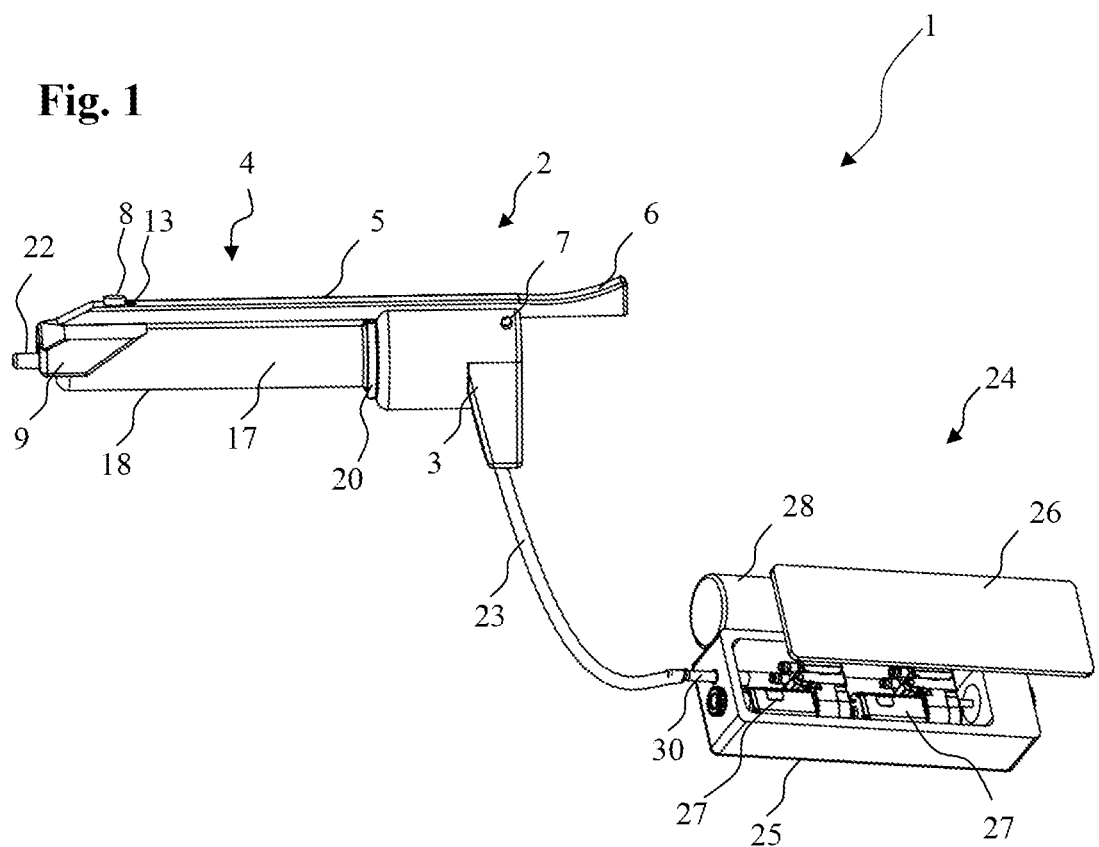
FIG. 1 a syringe system with a pen-like syringe device and an external supply unit according to a first embodiment.
Figure 2:
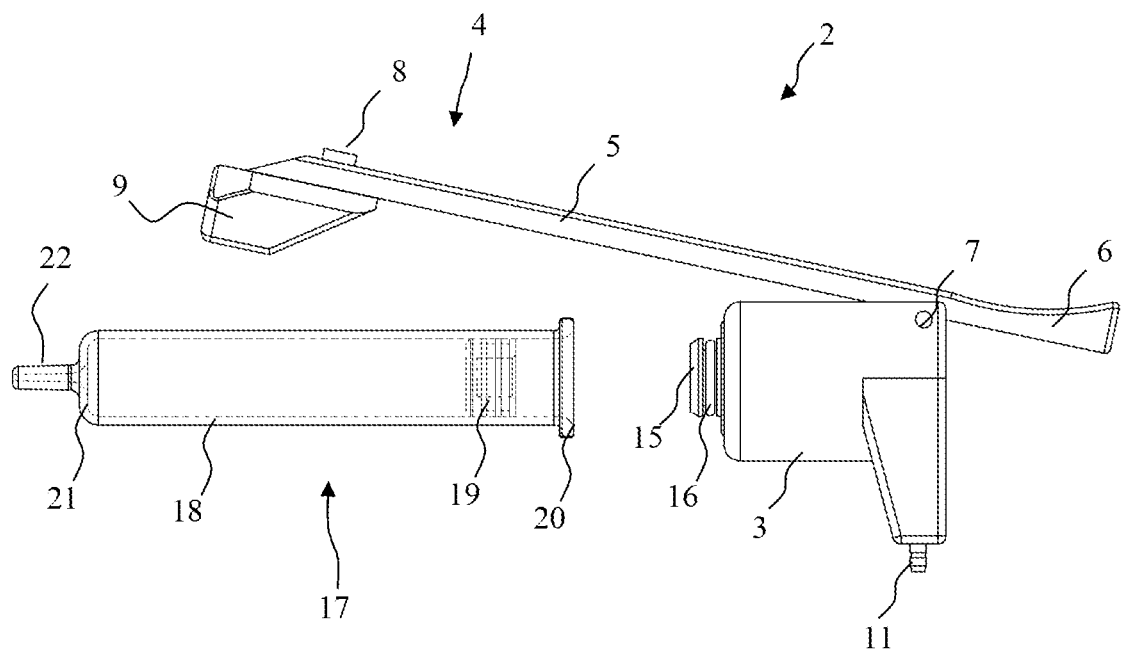
FIG. 2 a side view of the pen-like syringe device of FIG. 1 in the open position.

FIG. 1 shows a first embodiment example of a syringe system 1 with a pen-like syringe device 2 and an external supply unit 24, which can provide pressure or negative pressure for the pen-like syringe device 2 and is connected to the pen-like syringe device 2 via a hose 23. The pen-like syringe device 2 is shown in FIG. 2 in the open position and in FIGS. 3 to 5 in the closed position and with a syringe 17 inserted, the operating state of the pen-like syringe device 2. The external supply unit 24 is shown in detail in FIG. 6.

The pen-like syringe device 2 has, as shown in particular in FIGS. 2 to 5, a drive housing 3 and a syringe receptacle 4 adjoining the drive housing 3 for receiving a syringe 17, which has a syringe body 18 with a syringe flange 20 arranged at the rear (distal) end and a nozzle 22 arranged at the front (proximal) end and a plunger 19 or syringe stopper movably guided in the syringe body 18. The drive housing 3 thereby forms a rear (distal) part and the syringe receptacle 4 forms a front (proximal) part of the pen-like syringe device 2. The syringe receptacle 4 is formed by an operating lever 5 connected to the drive housing 3 via a swivel joint 7, which operating lever 5 has a head unit 8 at its end pointing away from the drive housing 3. The swivel joint 7 is arranged in a rear area of the drive housing 3. An actuating end 6 of the operating lever 5 projects beyond the rear end of the drive housing 3, so that when an operator presses the actuating end 6, the operating lever 5 is rotated from a closed position shown in FIG. 3 to an open or upper position shown in FIG. 2.

In the open position shown in FIG. 2, a syringe 17 can be inserted into the syringe receptacle 4. The syringe 17 is thereby pushed onto a connection portion 15, which is arranged on the front side of the drive housing 3 facing in the direction of the syringe receptacle 4 and engages somewhat in the interior of the syringe 17 or the syringe body 18. A sealing ring 16 is applied to the connection piece 15 by means of which there is a gas-tight or air-tight connection between the connection piece 15 and the syringe 17 or the interior of the syringe body 18.

Figure 3:
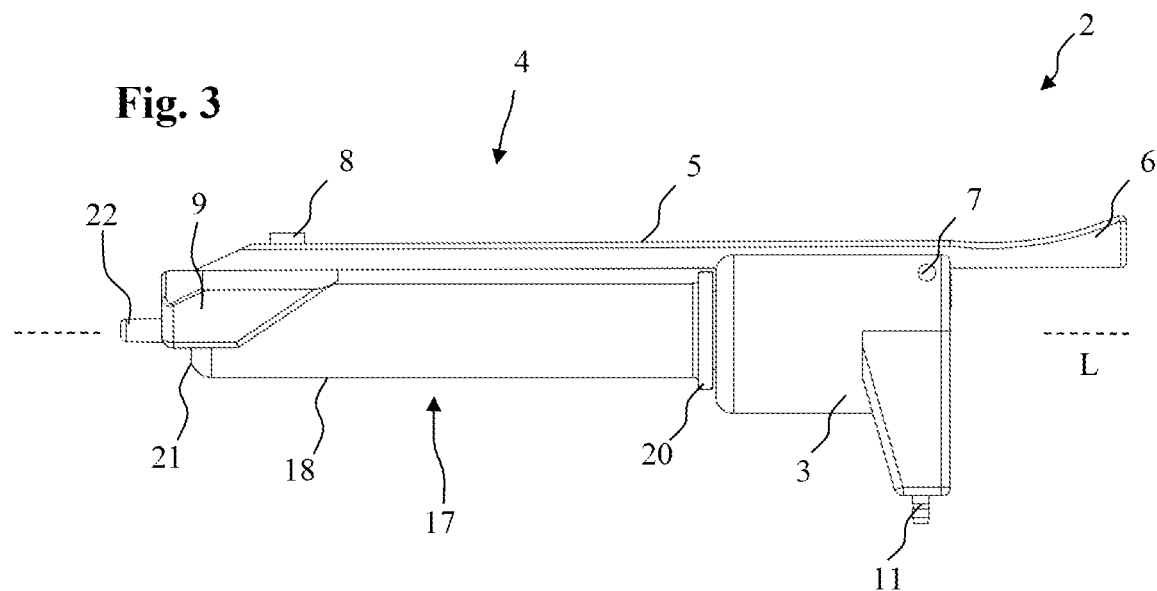
FIG. 3 a side view of the pen-like syringe device of FIG. 1 in the closed position with a syringe inserted.

In the closed state of the pen-like syringe device 2, with the operating lever 5 in the closed or lower position shown in FIG. 3, the head unit 9 grips around the upper portion, pointing in the direction of the operating lever 5, of a syringe shoulder 21 arranged at the front (proximal) end of the syringe 17, the part of the syringe shoulder 21 grasped by the head unit 9 bearing directly against the head unit 9. The syringe 17 is thereby clamped by the head unit 9 and the front end of the drive housing 3, against which the syringe flange 20 rests. Clamping of the syringe flange 20, i.e. application of force from the front edge of the syringe flange 20 in the direction of the drive housing 3, does not occur in the embodiment example described. Breaking of the syringe flange 20 due to deviations occurring in this area, especially of a syringe flange 20 slightly inclined towards the front end of the syringe 17, are thus avoided. The drive housing 3 may also have a flange mount that encompasses the syringe flange 20. In particular, the drive housing 3 can thereby have, on the side facing in the direction of the syringe receptacle 4, a sealing element which is not shown, in particular a second sealing ring, which bears against the syringe flange 20 and by means of which a gas-tight or air-tight connection is provided between the syringe flange 20 and the drive housing 3. In the closed state of the pen-like syringe device 2 shown in FIG. 3, the nozzle 22 of the syringe 17 thereby projects beyond the front end of the head unit 9.

When an injection is to be performed, for example an ophthalmological injection of perfluorocarbons into the eye of a patient, the syringe 17 inserted into the syringe receptacle 4 is filled with a substance to be injected. The substance to be injected is arranged between nozzle 22 and plunger 19 in the syringe body 18 of the syringe 17. When a removal is to be carried out, however, the syringe 17 inserted into the syringe receptacle 4 is not filled. The plunger 19 is thereby initially arranged at or near the nozzle 22. The pen-like syringe device 2, in particular the syringe receptacle 4, is configured according to the size of a syringe 17 to be inserted into the syringe receptacle 4. For example, the syringe receptacle 4 may be configured to receive standard syringes known for injection or removal, in particular 10 ml syringes used, for example, in the injection of perfluorocarbons.

Figure 5:
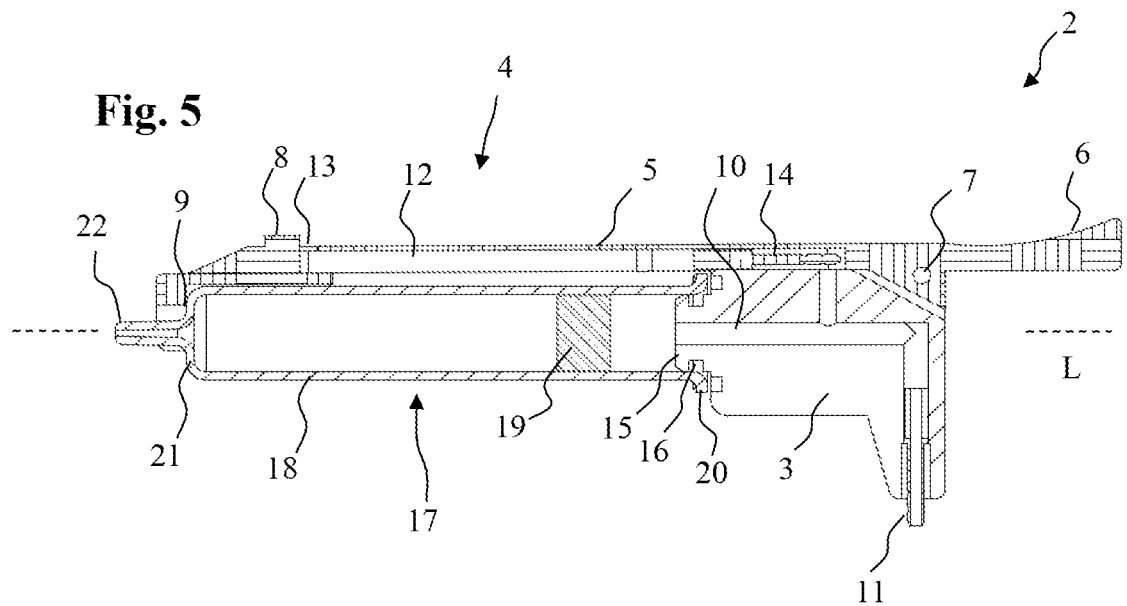
FIG. 5 a sectional view along a longitudinal axis of the pen-like syringe device of FIG. 1 in the closed position with a syringe inserted.

Injection or removal is effected by pneumatic application of pressure or negative pressure to the plunger 19 movably guided in the syringe body 18 of the syringe 17, in particular by direct application of pressure or negative pressure to the plunger 19. For applying pressure or negative pressure to the plunger 19, the drive housing 3 has a pressure supply unit and a coupling connection 5 arranged on the underside of the drive housing 3. The pressure supply unit comprises a drive channel 10 connected to the plunger 19 of a syringe 17 inserted into the syringe receptacle 4, which drive channel 10, as shown in FIG. 5, extends through the connection piece 15 and the drive housing 3 and is connected to the coupling connection 5. In particular, the drive channel 10 may be formed by one or more hose elements extending in the drive housing 3, which are not shown. The external supply unit 24, which is connected to the coupling connection 5 via the hose 23 as shown in FIG. 1, can be used to apply pressure or negative pressure to the pressure supply unit and thus to the plunger 19. The external supply unit 24 is actuated via a push button 8 arranged on the front area on the operating lever, which can be manually actuated by a finger and is connected to the delivery unit via an actuation connection that is not shown. The push button 8 is actuated perpendicular to the longitudinal direction L of the pen-like syringe device 2.

Figure 4:
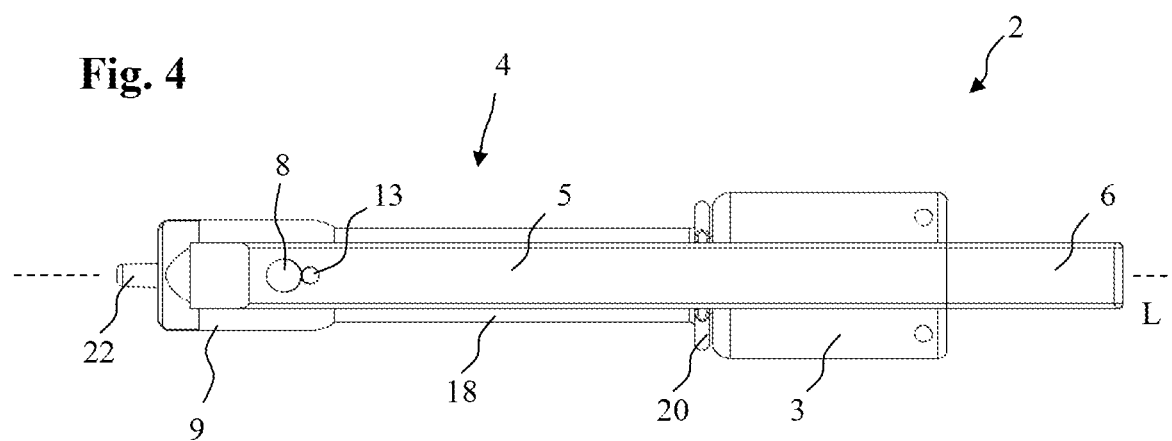
FIG. 4 a top view of the pen-like syringe device of FIG. 1 in the closed position with a syringe inserted.

Further, the pen-like syringe device 2 comprises a vent channel 12 having a first end connected to the drive channel 10 and a second end connected to the environment via an opening 13. The opening 13 is thereby arranged, as shown in FIG. 4, directly at the push button 8 more precisely on the side facing to the drive housing 3 on the upper side of the operating lever 5. As shown in FIG. 5, the vent channel 12 runs in the operating lever 5 from the opening 13 to a connection portion 14 arranged in the rear region of the operating lever 5, from the connection portion 14 into the drive housing 3 and from there through the drive housing 3 to the drive channel 10. The section formed between the connection portion 14 and the drive channel 10 is thereby preferably formed by a hose section not shown, which is connected to the connection portion 14 and which, in particular, allows the operating lever 5 to be rotated into the open position shown in FIG. 2. Furthermore, the connection between the drive channel 10, in particular of a drive channel 10 formed by several hose sections, and the vent channel 12 can be formed by a T-piece not shown connecting the individual hose sections.

Figure 6:
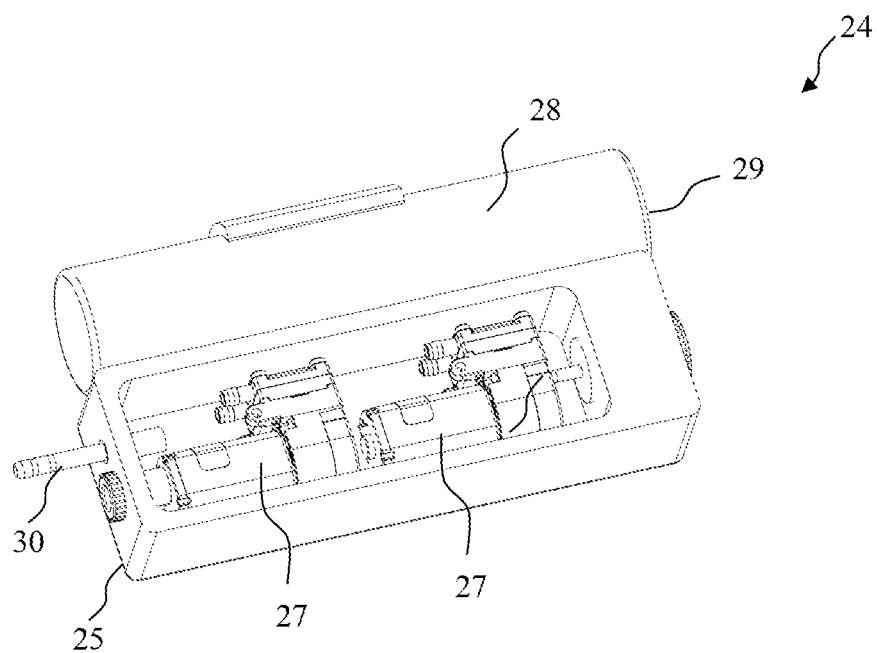
FIG. 6 the external supply unit of the syringe system from FIG. 1 without cover.

The external supply unit 24 shown in detail in FIG. 6 comprises a cuboid housing 25 with a cover 26 shown in FIG. 1 and omitted in FIG. 6, in which external supply unit 24 an electrical delivery unit 27, in this case two diaphragm pumps, for generating pressure or negative pressure is arranged. Furthermore, the external supply unit 24 comprises a power supply unit 28, specifically an accumulator, arranged on the housing 25. Here, the power supply unit 28 serves to supply the electrical delivery unit 27 with electrical energy and can be charged via a charging connection 29, for example a USB connection. Furthermore, the external supply unit 24 has a coupling piece 30 connected to the electrical delivery unit 27, via which the external supply unit 24, as shown in FIG. 1, can be fluidically connected to the coupling connection 11 of the pen-like syringe device 2 via a hose 23.

Figure 7:
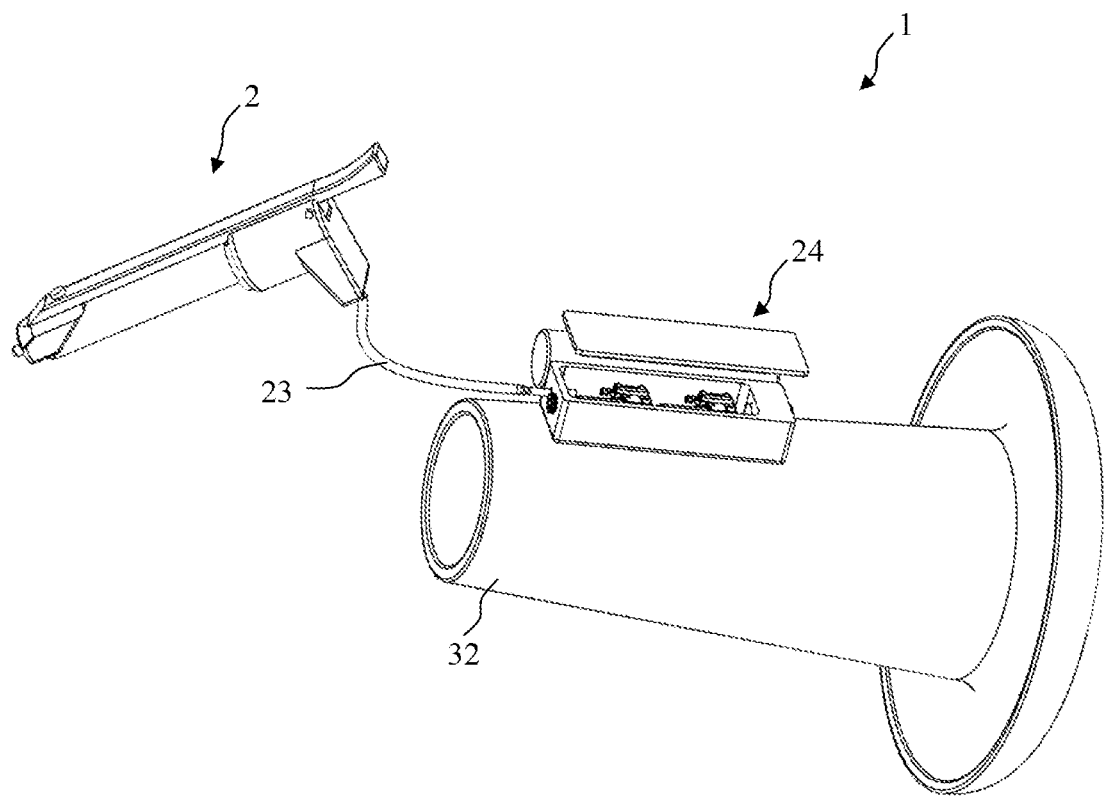
FIG. 7 the syringe system from FIG. 1 with outlined wrist band.

FIG. 7 shows the syringe system from FIG. 1, whereby the electrical delivery unit 27 is attached to a sketched wrist band 32. For the sake of clarity only, not all reference signs of the syringe system 1 or the pen-like syringe device 2 and the external supply unit 24 are drawn in FIG. 7. The wrist band 32 and the electrical delivery unit 27 can be covered, for example, by an operator's clothing, specifically the sleeve of a surgical gown, when the syringe system 1 is in use.

Figure 8:
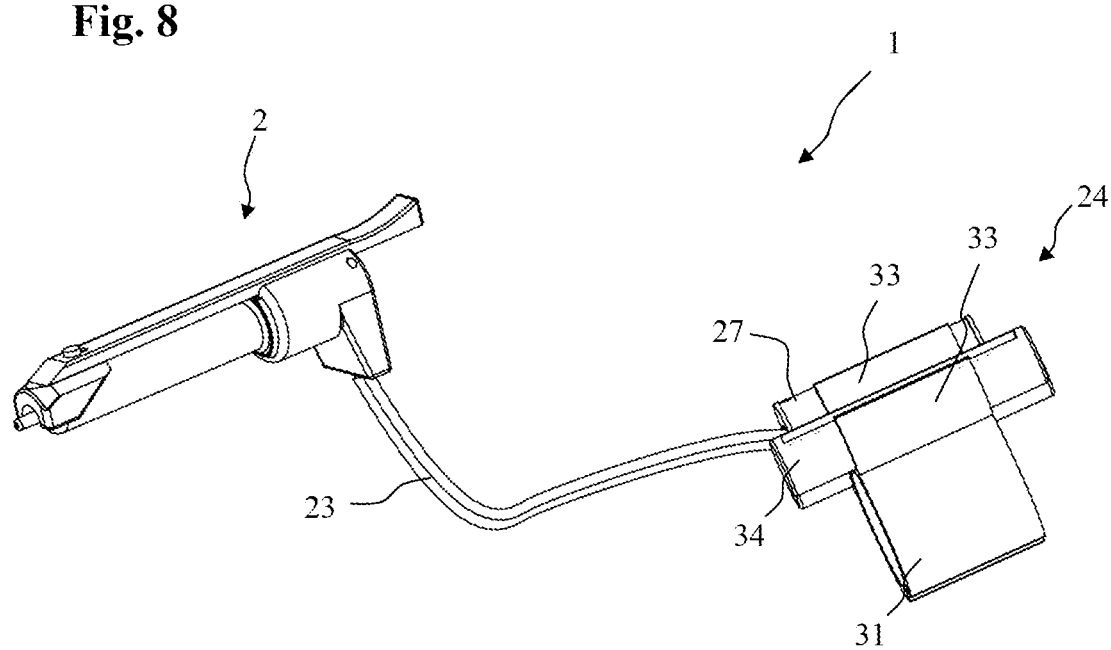
FIG. 8 a syringe system with a pen-like syringe device and an external supply unit according to a second embodiment.

FIG. 8 shows a syringe system 1 with a pen-like syringe device 2 and an external supply unit 24 according to a second embodiment. The syringe system 1 differs from the first embodiment by the design of the external supply unit 24 shown in detail in FIG. 9. The pen-like syringe device 2 corresponds to the pen-like syringe device 2 of the first embodiment, although not all reference signs of the pen-like syringe device 2 are shown in FIG. 8 merely for reasons of clarity.

Figure 9:
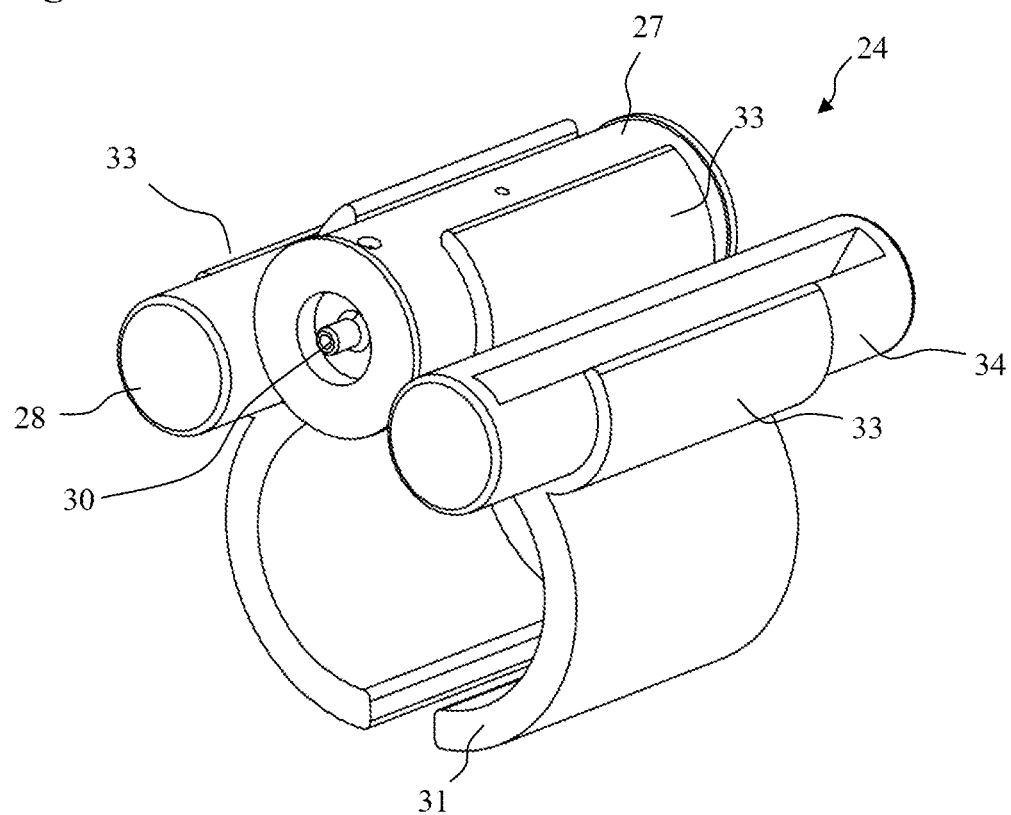
FIG. 9 the external supply unit of the syringe system from FIG. 8.

The external supply unit 24 of the second embodiment shown in detail in FIG. 9 is designed as an arm cuff 31, which has three module receivers 33 arranged next to each other in the circumferential direction. An electrical delivery unit 27, which is also designed as a diaphragm pump in this embodiment, is removably inserted in the middle module receiver 33. The electrical delivery unit 27 also has a coupling piece 30 via which the external supply unit 24, as shown in FIG. 8, can be connected to the coupling connection 11 of the pen-like syringe device 2 via a hose 23. A power supply unit 28, in particular an accumulator, for supplying the electrical delivery unit 27 with electrical energy is arranged in one of the two external module receivers 33. The power supply unit 28 can be charged via a charging connection 29, for example a USB connection. A towel dispenser 34 is removably inserted into the other module receiver 33. A textile cover, in particular a cloth, can thereby be provided by the towel dispenser 34 for covering the external supply unit 24. The cloth can thereby be guided, for example, around the entire arm cuff back to the towel dispenser 34 and fixed there. This enables simple and quick sterile covering of the external supply unit 24 during use of the syringe system 1.

The operation and function of the syringe system 1 is described below on the basis of an injection to be performed. Here, a syringe 17 filled with a substance to be injected is inserted into the syringe receptacle 4 and the pen-like syringe device 2 is in the closed position provided for operation as shown in FIG. 3. In this case, the pen-like syringe device 2 has approximately the size of a human hand and is held and guided like a pen between the thumb, index finger and middle finger, with the index finger resting on or against the operating lever 5. The external supply unit 24 is arranged on an arm of the operator via the wrist band 32 or the arm cuff 31.

During the injection to be performed, the electrical delivery unit 27 of the external supply unit 24 is activated by an operator's finger, here the index finger, actuating the push button 8. Pressure, in this case compressed air, is applied to the pressure supply unit of the pen-like syringe device 2 via the hose 23. When the pen-like syringe device 2 is properly handled or the push button 8 is properly actuated, the opening 13 is automatically and forcibly closed by the finger actuating the push button 8. Via the drive channel 10, the compressed air used as drive medium is conveyed in the direction of the plunger 19 of the syringe 17 inserted into the syringe receptacle 4. When the opening 13, which is connected to the drive channel 10 via the vent channel 12, is closed, pressure is applied to the plunger 19. The plunger 19, which is movably guided in the syringe body 18, is thereby moved in the direction of the nozzle 22, whereby the substance contained in the syringe 17 is dispensed from the nozzle 22 or a cannula attached thereto. When the opening 13 is not closed, for example when the push button 8 is not properly actuated or when the actuation of the push button 8 is terminated, the drive channel 10 and thus the plunger 19 are in communication with the environment. A (further) pressurization of the plunger 19 does not occur due to the air escaping through the opening 13. When the push button 8 is terminated, this ensures that the injection is terminated immediately, in particular without any after-effects such as dripping. In addition, it is ensured that no injection takes place if the push button 8 is not actuated properly or in an uncontrolled manner.

In the case of a removal of a substance not described in more detail, for example a removal from a human body, in which the plunger 19 is subjected to negative pressure instead of pressure, the above statements apply accordingly.

Due to the design of the syringe system 1 according to the invention, a simple and safe holding, guiding and operating, of the pen-like syringe device 2, in particular independent of the size of the hand of an operator and thus a safe and targeted injection or removal of a substance is given. In particular, the pen-like syringe device 2 is very light due to the outsourcing of the electrical delivery unit 27 and the power supply unit 28, and thus offers a high degree of comfort and a pleasant, non-exhausting use of the pen-like syringe device 2. The syringe system 1 according to the invention does not involve the risk of possible contamination of the substance to be injected or removed, which is present in prior art syringe systems, in particular due to a plunger rod (lubricated mechanism) connected to the plunger for driving it, or due to decanting of the substance to be injected or removed from an external container into the syringe or vice versa. The pen-like syringe device 2 shown also enables a syringe 17 to be easily and quickly inserted into and removed from the syringe receptacle 4 by means of the operating lever 5 rotatably hinged to the drive housing 3. In particular, conventional standard syringes (without finger flange and piston rod) can be used with the pen-like syringe device 2 according to the invention. The syringe receptacle 4 and the connection piece 15 are designed in accordance with the (standard) syringes 17 to be used.

The invention is not limited to the embodiments described above. For example, an embodiment is also possible in which the electrical delivery unit 27, specifically a diaphragm pump, is arranged in the drive housing 3 of the syringe device 2 and is part of the pressure supply unit. The coupling connection 11 is here an electrical connection connected to the electrical delivery unit 27, which is used for electrical connection to a power supply unit 28 arranged in the external supply unit 24. Instead of a hose 23, a cable connection is used here for the power supply.

In addition, other designs of the external supply unit 24 and the pen-like syringe device 2 are also possible, for example an arrangement of the opening 13 on the upper side of the push button 8. Furthermore, it is also possible that the syringe receptacle 4 is designed to be temperature-controlled, in particular heatable, for which purpose a temperature control unit is arranged in the syringe device 2 and is supplied with electrical energy via the power supply unit 28 or another external power supply unit, in particular another external power supply unit arranged on the external supply unit 24.

Furthermore, the syringe receptacle 4 can also have a splinter protection, i.e. a protection against splinters in case of an occurring damage of the syringe 17. For example, the splinter protection can be formed by a plexiglass element arranged on the operating lever, which covers the syringe 17 or into which the syringe 17 is inserted. Alternatively or additionally, the syringe 17 may comprise a circumferential label, specifically a label circumferentially surrounding the syringe body 18, which prevents splintering of the syringe 17 or at least detachment of splinters.

REFERENCE SIGNS

1 Syringe system
2 Pen-like syringe device
3 Drive housing
4 Syringe receptacle
5 Operating lever
6 Actuating end
7 Swivel joint
8 Push button
9 Head unit
10 Drive channel
11 Coupling connection
12 Vent channel 13 Opening
14 Connection portion
15 Connection piece
16 Sealing ring
17 Syringe
18 Syringe body
19 Plunger
20 Syringe flange
21 Syringe shoulder
22 Nozzle
23 Hose
24 External supply unit
25 Housing
26 Cover
27 Electrical delivery unit
28 Power supply unit
29 Charging connection
30 Coupling piece
31 Arm cuff
32 Wrist band
33 Module receiver
34 Towel dispenser
L Longitudinal direction

The invention claimed is:

1. A pen-like syringe device for medical purposes, comprising a drive housing, a syringe receptacle adjoining the drive housing for receiving a syringe, which has a syringe body and a plunger movably guided in the syringe body, and a manually operable push button for activating an electrical delivery unit, wherein the drive housing has a pressure supply unit for pneumatically applying pressure or negative pressure to the plunger of a syringe inserted into the syringe receptacle and a coupling connection for pneumatically and/or electrically connecting the pressure supply unit to an external supply unit which is arranged away from the drive housing, the pen-like syringe device having no integrated power supply unit, and the pressure supply unit comprising a drive channel which is connectable to the plunger of the syringe inserted into the syringe receptacle and the pen-like syringe device comprises a vent channel having a first end connected to the drive channel and a second end connected to the environment via an opening, the opening being closable by a finger actuating the push button upon actuation of the push button.

2. The pen-like syringe device according to claim 1, wherein the opening is arranged directly on or directly next to the push button and can thereby be closed directly by the finger actuating the push button.

3. The pen-like syringe device according to claim 1, wherein the external supply unit comprises an electrical delivery unit for supplying the pressure supply unit with pressure or negative pressure.

4. The pen-like syringe device according to claim 3, wherein activation of the electrical delivery unit is effected by actuating the push button.

5. The pen-like syringe device according to claim 3, wherein the electrical delivery unit comprises a diaphragm pump.

6. The pen-like syringe device according to claim 1, wherein the pressure supply unit comprises an electrical delivery unit connected to the drive channel, the electrical delivery unit being activated and the drive channel being applied with pressure or negative pressure by actuating the push button.

7. The pen-like syringe device according to claim 1, wherein the push button is arranged near the front end or the end facing away from the drive housing of the pen-like syringe device.

8. The pen-like syringe device according to claim 1, wherein the syringe receptacle comprises an operating lever which is pivotably connected to the drive housing via a swivel joint arranged at an end of the drive housing facing away from the syringe receptacle.

9. The pen-like syringe device according to claim 8, wherein the vent channel runs at least partially in the operating lever and/or the push button and the opening is arranged on or on top of the operating lever.

10. The pen-like syringe device according to claim 1, wherein the syringe receptacle comprises a head unit, which at least partially grips a syringe shoulder of a syringe inserted into the syringe receptacle, at least part of the syringe shoulder bearing directly against the head unit in an operating state of the pen-like syringe device.

11. The pen-like syringe device according to claim 10, wherein a syringe inserted into the syringe receptacle is clamped and fixed in the operating state of the pen-like syringe device by the head unit and the side of the drive housing facing in the direction of the syringe receptacle, so that no clamping of a syringe flange of the syringe takes place.

12. The pen-like syringe device according to claim 1, wherein the pen-like syringe device has a temperature control unit for controlling the temperature of a substance contained in an inserted syringe.

13. The pen-like syringe device according to claim 1, wherein a syringe is inserted into the syringe receptacle.

14. A syringe system comprising the pen-like syringe device according to claim 1, and an external supply unit arranged away from the pen-like syringe device, the external supply unit comprising a power supply unit with a battery or an accumulator and an electrical delivery unit.

15. The syringe system according to claim 14, wherein the electrical delivery unit comprises a diaphragm pump.

16. The syringe system according to claim 14, wherein the electrical delivery unit is connected to the push button of the pen-like syringe device via an actuating connection.

17. The syringe system according to claim 14, wherein the external supply unit comprises a fastening device with which the external supply unit is fastenable to an arm of an operator.

18. The syringe system according to claim 14, wherein the external supply unit comprises a towel dispenser dispensing a cover for covering the external supply unit.

19. The syringe system according to claim 14, wherein the external supply unit has a control unit for controlling the external supply unit.

20. The syringe system according to claim 14, wherein the external supply unit has a display unit for displaying parameters of the syringe system, the parameters including at least one of a state of the power supply unit, operating parameters of the electrical delivery unit, and pressure or negative pressure acting on the plunger of a syringe inserted into the syringe receptacle.

* * * * *